US012269046B2

(12) United States Patent
McCarthy et al.

(10) Patent No.: US 12,269,046 B2
(45) **Date of Patent: *Apr. 8, 2025**

(54) APPARATUS AND METHODS FOR CLEARING SMOKE WITHIN CLOSED ENVIRONMENTS USING NON-THERMAL MICROPLASMAS

(71) Applicant: STITCH PARTNERS, Apex, NC (US)

(72) Inventors: Justin McCarthy, Apex, NC (US); Warren J. Jasper, Cary, NC (US)

(73) Assignee: STITCH PARTNERS, Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,091

(22) Filed: Oct. 12, 2023

(65) Prior Publication Data

US 2024/0075482 A1 Mar. 7, 2024

Related U.S. Application Data

(60) Continuation of application No. 17/820,074, filed on Aug. 16, 2022, now Pat. No. 11,839,882, which is a (Continued)

(51) Int. Cl.
*H05H 1/24* (2006.01)
*B03C 3/45* (2006.01)

(52) U.S. Cl.
CPC ............ *B03C 3/45* (2013.01); *B03C 2201/28* (2013.01); *B03C 2201/30* (2013.01); *H05H 1/2406* (2013.01)

(58) Field of Classification Search
None
See application file for complete search history.

(56) References Cited

U.S. PATENT DOCUMENTS 6,455,014 B1 * 9/2002 Hammerstrom .......... A61L 9/22 422/186.04
6,572,685 B2 * 6/2003 Dunshee ................. B03C 3/155 55/487

(Continued)

FOREIGN PATENT DOCUMENTS

DE 19605226 A1 * 8/1997 ............. B01D 53/86
JP 2008 130343 A 6/2008

(Continued)

OTHER PUBLICATIONS

Jasper, Warren J, and Srinivasan C Rasipuram. "8—Plasma Textiles as Fibrous Filter Media." Fibrous Filter Media. Elsevier Ltd, 2017. 191-210. Web. (Year: 2017).*

(Continued)

*Primary Examiner* — Christopher P Jones
*Assistant Examiner* — Sonji Turner
(74) *Attorney, Agent, or Firm* — Andrew F. Young, Esq.; NOLTE LACKENBACH SIEGEL

(57) ABSTRACT

Apparatus for deactivating airborne biological organisms in a closed environment, including a fibrous substrate having one or more of non-conductive fibers and non-conductive yarns; elongated, substantially parallel electrodes disposed on or embedded in the fibrous substrate arranged as one or more pairs of adjacent electrodes, wherein a discharge gap is defined between each pair; a component configured for applying a voltage between each pair to generate a non-thermal microplasma in a corresponding discharge gap, wherein the non-thermal microplasma deactivates one or more biological organisms in air present within the closed environment; and a detector in communication with the apparatus.

8 Claims, 8 Drawing Sheets

Related U.S. Application Data division of application No. 16/681,878, filed on Nov. 13, 2019, now Pat. No. 11,413,627.

(56) References Cited

U.S. PATENT DOCUMENTS

| | | | | |
|---|---|---|---|---|
| 6,635,228 | B1 * | 10/2003 | Moore | B01D 53/75 422/186.04 |
| 7,258,723 | B2 * | 8/2007 | Crawley | B03C 3/885 96/24 |
| 7,338,684 | B1 * | 3/2008 | Curliss | D01F 9/1275 427/249.4 |
| 7,833,322 | B2 * | 11/2010 | Botvinnik | B03C 3/68 96/24 |
| 8,157,902 | B2 * | 4/2012 | Ogut | F01N 3/38 60/275 |
| 9,308,366 | B2 * | 4/2016 | Warren | B03C 3/383 |
| 10,111,977 | B1 * | 10/2018 | Woodbridge | H05H 1/48 |
| 10,363,429 | B2 * | 7/2019 | Weltmann | A61N 1/44 |
| 2004/0140194 | A1 * | 7/2004 | Taylor, Jr. | B01D 53/0446 422/186.04 |
| 2008/0063559 | A1 * | 3/2008 | Alexander | F24H 3/0411 422/22 |
| 2011/0011629 | A1 | 1/2011 | Trigwell | |
| 2011/0247499 | A1 * | 10/2011 | Langner | B03C 3/09 96/54 |
| 2012/0156091 | A1 * | 6/2012 | Fridman | A61L 2/03 422/243 |
| 2013/0000280 | A1 * | 1/2013 | Korenev | F02D 41/1466 73/23.31 |
| 2015/0157870 | A1 | 6/2015 | Kalghatgi | |
| 2016/0331437 | A1 * | 11/2016 | Holbeche | H05H 1/52 |
| 2021/0112651 | A1 * | 4/2021 | Lee | A61N 1/0476 |

FOREIGN PATENT DOCUMENTS

| | | | |
|---|---|---|---|
| WO | 98/07471 | A2 | 2/1998 |
| WO | 2017/147625 | A2 | 8/2017 |

OTHER PUBLICATIONS

Kuznetsov, Ivan A et al. "Development of Active Porous Medium Filters Based on Plasma Textiles." AIP Conference Proceedings. vol. 1453. United States: N.p., 2012. Web. (Year: 2019).*

Srinivasan Chandrasekaran Rasipuram. Filtration Properties of Plasma Textile. Dissertation, NCSU. 2015. (Year: 2015).*

* cited by examiner

APPARATUS AND METHODS FOR CLEARING SMOKE WITHIN CLOSED ENVIRONMENTS USING NON-THERMAL MICROPLASMAS

CROSS REFERENCES TO RELATED APPLICATIONS

The present application claims the benefit of the filing date of U.S. Utility patent application Ser. No. 16/681,878, filed Nov. 13, 2019, which application is incorporated in its entirety by reference herein.

TECHNICAL FIELD

The present invention relates generally to non-thermal plasmas, and particularly to the use of non-thermal plasmas to reduce translucence or opacity caused by smoke present within a closed environment.

BACKGROUND

Fires that may occasionally occur aboard vehicles such as aircrafts, spacecrafts, ships, submarines, passenger trains, buses, etc. present a specific set of challenges not found in fires that occur in fixed installations on land. In a vehicle in motion, it can be particularly chaotic and life threatening for passengers and crew travelling in a vehicle that fills with smoke. Serious injuries and even fatalities can result if passengers are unable to find their way to the nearest exit due to smoke obstructing their vision; this is true even if the vehicle comes to a stop or makes an emergency landing on the ground after a fire breaks out. For example, if a fire or a non-fire combustion were to break out within the cabin of an aircraft, it can cause a lot of confusion and chaos among the passengers, particularly if the cabin space starts to fill up with smoke. However, letting outside air into the smoke-filled space can be particularly challenging since it is not feasible to open the windows to let outside air in; this is true even if the aircraft is on ground. Similarly, when a fire breaks out within the cockpit of an aircraft, it can be advantageous to clear up the smoke as quickly as possible so that the aircraft crew can see their instruments, see through the windows, and fly the aircraft.

Land based fixed installations such as, for example, movie theaters, auditoriums, convention centers, office buildings, hostels, high-rise buildings and similar other establishments too can benefit from clearing up the smoke created by fire as quickly as possible so that the occupants of such installations can be evacuated safety and in short duration of time.

Accordingly, opportunities exist for improving occupant safety during emergency fire incidents by reducing or eliminating translucence or opacity caused by smoke resulting from the fire incidents.

SUMMARY

To address the foregoing problems, in whole or in part, and/or other problems that may have been observed by persons skilled in the art, the present disclosure provides methods, processes, systems, apparatus, instruments, and/or devices, as described by way of example in embodiments set forth below.

According to an embodiment, an apparatus for reducing translucence or opacity caused by smoke within a closed environment includes a fibrous substrate comprising one or more of non-conductive fibers and non-conductive yarns.

The apparatus also includes elongated, substantially parallel electrodes disposed on or embedded in the substrate arranged as one or more pairs of adjacent electrodes. A discharge gap is defined between each pair. The apparatus additionally includes a component configured for applying a voltage between each pair to generate a non-thermal microplasma in a corresponding discharge gap to collect or bind one or more airborne particulate combustion byproducts.

According to one or more embodiments, the apparatus further includes a smoke detection device in communication with the apparatus.

According to one or more embodiments, the apparatus further includes a micro-controller for energizing the apparatus to generate a non-thermal microplasma when smoke is detected by a smoke detection mechanism.

According to one or more embodiments, each electrode has a characteristic dimension ranging from 1 μm to 1 mm.

According to one or more embodiments, the substrate has a cylindrical configuration.

According to one or more embodiments, the electrodes form a double helix profile within a cylindrical configuration of the substrate.

According to one or more embodiments, the component is a power storage component comprising a battery or a charged capacitor, wherein the apparatus is configured for mobility whereby the self-contained self-sufficient apparatus can be moved to, and deployed to, remote locations. According to one or more embodiments, the component is powered by a battery or a charged capacitor, wherein the apparatus is configured for mobility whereby the self-contained self-sufficient apparatus can be moved to, and deployed to, remote locations.

According to one or more embodiments, the component comprises a voltage source in signal communication with the electrodes.

According to one or more embodiments, the component is configured for applying a DC voltage between each pair of adjacent electrodes.

According to one or more embodiments, the component is configured for applying the DC voltage at a magnitude ranging from 10V to 100 kV.

According to one or more embodiments, the component is configured for applying DC voltages in pulses.

According to one or more embodiments, the voltage source is configured for applying an AC voltage between each pair of adjacent electrodes.

According to one or more embodiments, the substrate comprises one or more of: woven, knit and non-woven textile.

According to one or more embodiments, the substrate is configured for removal, clean-up, and subsequent reuse.

According to one or more embodiments, the substrate is selected from a group comprising one or more of: flame-retardant fibers, fiberglass, and aramids.

According to one or more embodiments, the substrate is configured for a roll-up disposition in a storage configuration, and for an unrolled disposition in a deployed configuration.

According to one or more embodiments, the substrate further comprises a carbon layer or carbon yarn configured to passively absorb toxic gases.

According to one or more embodiments, the carbon layer or carbon yarn includes activated charcoal.

According to one or more embodiments, the substrate further comprises a carbon layer or carbon yarn comprises one or more of: a woven, knit and non-woven textile.

According to one or more embodiments, the apparatus further includes a trigger for turning the apparatus on and/or for energizing the component for generating the non-thermal microplasma to remove one or more combustion byproducts from the air to reduce translucence or opacity caused by smoke within the closed environment.

According to one embodiment, a method for fabricating an apparatus for generating a non-thermal microplasma includes providing a fibrous air-filter, and arranging elongated, substantially parallel electrodes on the fibrous air-filter as one or more pairs of adjacent electrodes, wherein a discharge gap is defined between each pair. The method also includes placing a component in signal communication with the electrodes for applying a voltage between each pair. The method further includes generating a non-thermal microplasma in a corresponding discharge gap and removing one or more combustion byproducts from ambient air.

According to one embodiment, a method for reducing translucence or opacity caused by smoke within a closed environment includes providing an apparatus for generating a non-thermal microplasma. The apparatus includes a fibrous substrate comprising one or more of non-conductive fibers and non-conductive yarns; a plurality of elongated, substantially parallel electrodes disposed on the substrate arranged as one or more pairs of adjacent electrodes, wherein a discharge gap is defined between each pair; and a component configured for applying a voltage between each pair to generate a non-thermal microplasma in a corresponding discharge gap. The method also includes applying a voltage between one or more pairs of adjacent electrodes disposed on a substrate, at a voltage magnitude to ignite a two-dimensional non-thermal microplasma in a discharge gap between each pair of adjacent electrodes. The method further includes continuing to apply the voltage at a voltage magnitude to maintain the non-thermal microplasma for a desired period of time. The method additionally includes removing one or more combustion byproducts from air to reduce translucence or opacity caused by smoke within the closed environment.

According to one or more embodiments, the method further includes removing the substrate; cleaning the substrate; and, affixing the substrate back to the apparatus.

BRIEF DESCRIPTION OF THE DRAWINGS

The invention can be better understood by referring to the following FIG.s. The components in the Figures are not necessarily to scale, emphasis instead being placed upon illustrating the principles of the invention. In the Figures, like reference numerals designate corresponding parts throughout the different views.

DETAILED DESCRIPTION

Figure 1:
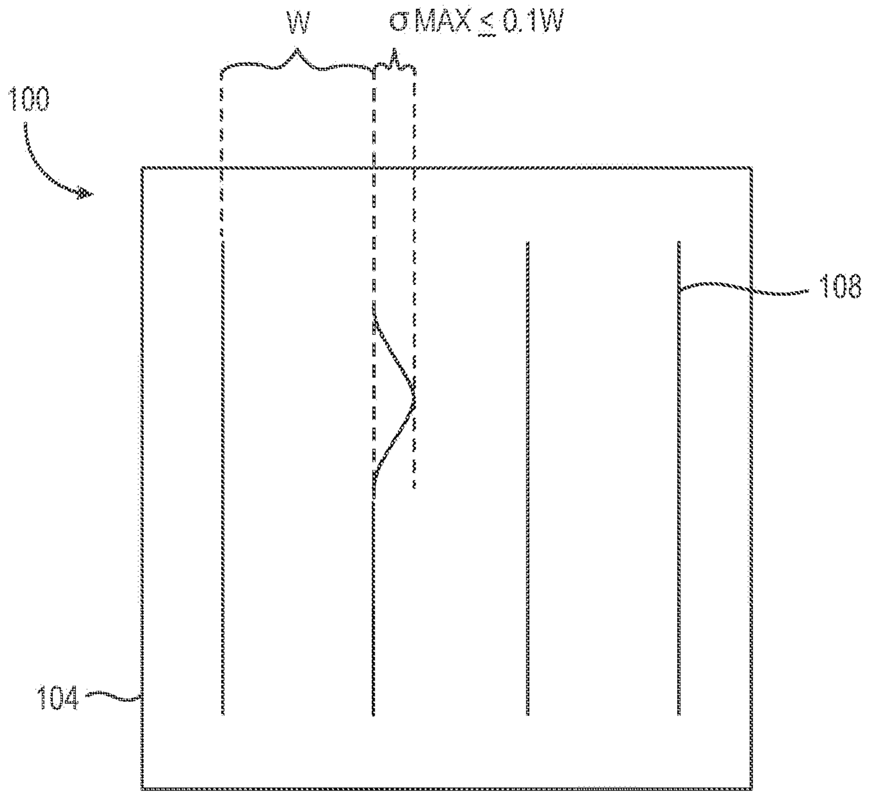
FIG. 1 is a top plan view of an example of an apparatus for generating a non-thermal microplasma, according to an embodiment of the present disclosure.

As noted earlier, fires aboard moving vehicles such as aircrafts, ships, submarines, passenger trains, buses, etc. present a specific set of challenges not found in fires that break out in fixed installations on land. Serious injuries and even fatalities can result if passengers are unable to find their way to the nearest exit due to smoke obstructing their vision. For example, if a fire or a non-fire combustion were to occur within the cabin or the cockpit of an aircraft, it can be advantageous to clear up the smoke as quickly as possible. Similarly, in land based fixed installations such as, for example, movie theaters, auditoriums, convention centers, office buildings, hotels, high-rise buildings and similar other establishments can benefit from clearing up the smoke created by fire as quickly as possible so that the occupants of such installations can be evacuated safety and in short duration of time.

Smoke is typically made up of water vapor, carbon monoxide, carbon dioxide, nitrogen oxide, irritant volatile organic compounds, air toxics and very small particles resulting from incomplete combustion. Embodiments and embodiments of the presently disclosed subject matter can advantageously operate to clear up smoke within enclosed environments such as a cockpit or a cabin of an aircraft through systems, for example. Embodiments and embodiments of the presently disclosed subject matter advantageously apply methods and devices for generating non-thermal microplasma from plasma textile material configured to remove particles and gases from smoke in a manner that clears up a portion of smoke within a short period of time in order to improve visibility in the area filled with smoke, as explained in detail below.

A plasma may generally be classified as being "thermal" or "non-thermal" depending on the relative temperatures of the electrons, neutral particles and ions comprising the plasma. In a thermal plasma, most of the electrical energy driving the plasma goes into heating the bulk of the plasma, and the various components comprising the plasma are generally in thermal equilibrium. In a non-thermal plasma, most of the electrical energy goes into the production of energetic electrons, active radicals and excited molecules, and the neutral particles and ions may be at much lower temperatures. Plasmas can be generated as three-dimensional fields (e.g., corona discharges) between plate-shaped electrodes or between a needle-shaped electrode and a plate-shaped electrode, as three-dimensional as gliding arcs between electrodes, and as plumes emitted from nozzles. Plasmas may be generated under atmospheric pressure conditions and thus have potential for a wide variety of applications. Plasmas of small dimensions are referred to as microplasmas. Microplasmas can be generated as dielectric barrier discharges (DBDs) between insulated electrodes driven by AC power. Microplasmas can also be generated using DC power. As used herein, the term "microplasma array" refers generally to surface plasma, or two-dimensional (2D) plasma of scalable dimensions. Generally, the thickness of surface or 2D plasma is small relative to its surface area.

Embodiments of the presently disclosed subject matter generate and employ non-thermal plasmas, microplasmas and microplasma arrays in the form of a plasma textile to clear up a substantial portion of smoke (e.g., by reducing the translucence or opacity caused by the smoke) present in closed HVAC environment such as, for example, an aircraft cockpit or cabin.

Whereas conventional methods for fabricating plasma sources typically entail implanting metal electrodes in rigid insulating matrices, embodiments of the presently disclosed subject matter advantageously use plasma textiles fabricated of flexible materials. Accordingly, embodiments of the presently disclosed subject matter provides for plasma textile materials that generate controllable two-dimensional or planar plasmas that utilize relatively low power, and which are fabricated utilizing low-cost, fibrous flexible materials including textiles.

As used herein, the term "elongated element" refers generally to a structure having an appreciable aspect ratio (length/characteristic dimension) in the sense that the length of the elongated element is appreciably greater than the characteristic dimension of the elongated element. Examples of elongated elements include, but are not limited to, fibers, filaments, yarns, threads, wires and rods. The "characteristic dimension" of an elongated element is a dimension descriptive of the size of the cross-section of the elongated element along an axis orthogonal to the length of the elongated element. The term "characteristic dimension" takes into account that different elongated elements may have differently shaped cross-sections. Thus, for example, the characteristic dimension of a cylindrical (or substantially cylindrical) elongated element may be taken to be the diameter of its cross-section (i.e., a circular cross-section). As another example, the characteristic dimension of an elongated element having an elliptical cross-section may be taken to be the major axis of the elliptical cross-section. As another example, the characteristic dimension of a polygonal (e.g., rectilinear, square, or other type of polygonal shape) elongated element may be taken to be the predominant or maximum distance between two opposing sides of its cross-section (e.g., width, height, etc.). For an elongated element having an irregularly shaped cross-section, the characteristic dimension may be taken to be that corresponding to a regular shape (e.g., circle, polygon, etc.) which the irregularly shaped cross-section most closely approximates (e.g., diameter, width, etc.).

Figure 2:
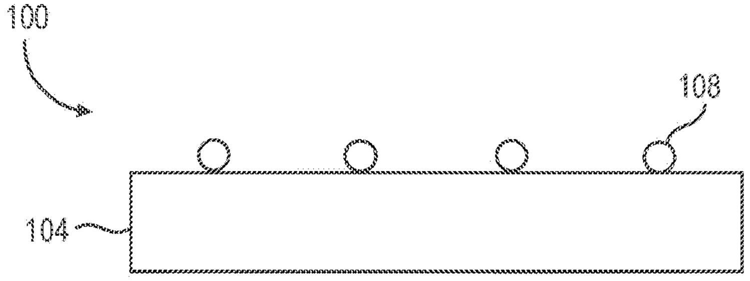
FIG. 2 is a side elevation view of the apparatus illustrated in FIG. 1, according to an embodiment of the present disclosure.

FIG. 1 is a top plan view, and FIG. 2 is a side elevation view, of an example of an apparatus for generating a non-thermal microplasma (or microplasma-generating apparatus) 100 according to an embodiment of the presently disclosed subject matter. The apparatus 100 may include a non-conductive (electrically insulating or dielectric) substrate 104 and a plurality of electrically conductive elongated elements (i.e., electrodes) 108 disposed on the substrate 104. For reference purposes, the electrodes 108 may be considered being elongated (or running) in a longitudinal direction of the apparatus 100 (the vertical direction from the perspective of FIG. 1). The substrate 104 may be rigid or flexible. In at least one embodiment, the substrate 104 is in the form of, or includes, a flexible textile material. In at least one embodiment, the conductive and/or non-conductive fibers/yarns that form part of substrate 104 comprise one or more of: a woven, knit and non-woven textile material.

The degree of flexibility of the substrate 104 (i.e., how readily the substrate 104 may be deflected or bent without structural failure) may vary in different embodiments, depending on the composition of the substrate 104. The substrate 104 may have a planar or two-dimensional configuration in the sense that the cross-sectional (or planar) area of the substrate 104 (in the plane shown in FIG. 1) may be significant in comparison to a thickness or height of the substrate 104 (in the plane shown in FIG. 2). It will be understood that FIG. 2 illustrates, by way of example only, the substrate 104 in a state where it is lying flat. When the substrate 104 is flexible, the cross-section of the substrate 104 in the plane shown in FIG. 2 may deviate from that shown. The planar area of the substrate 104 shown in FIG. 1 and the number of electrodes 108 provided are generally not limited, i.e., the apparatus 100 may be of any suitable size. Hence, it will be understood that FIGS. 1 and 2 may be representative of only a section or portion of a larger-sized apparatus, and further that any number of electrodes 108 may be provided. Moreover, the substrate 104 may have any suitable thickness. As one non-limiting example, the thickness of the substrate 104 ranges from 0.05 mm to 5 mm. In some embodiments, the substrate can comprise a cylindrical configuration as shown, for example, in FIG. 10.

The substrate 104 generally can be any fibrous non-conducting material such as, for example, a textile material or polymer. The composition of the substrate may include fibers embedded, encapsulated, supported, bound or attached to a non-fibrous component or matrix. Alternatively, the composition of the substrate 104 may exclusively or predominantly consist of yarns, which may be arranged in a one-dimensional, two-dimensional or multi-dimensional (i.e., yarns running in more than two directions) array. In the case of a two-dimensional or multi-dimensional array of yarns, the substrate 104 may be either a woven or non-woven fabric or mat. Examples of compositions of the substrate 104 include, but are not limited to, cellulosic (or lignocellulosic) or polymeric materials and woven or non-woven textile materials. In the present context, the term "cellulosic materials" is used to generically describe various paper-based (or pulp-based) materials, examples of which include, but are not limited to, cardboard, card stock, paperboard, extruded paperboard, fiberboard, corrugated fiberboard, linerboard (or containerboard), or pulp-based materials heavier than the foregoing. In the case of a woven or non-woven textile, the fibers of the substrate 104 may be any suitable textile material, non-limiting examples of which include polypropylene, polyester, fiberglass, aramids or nylon.

Figure 10:
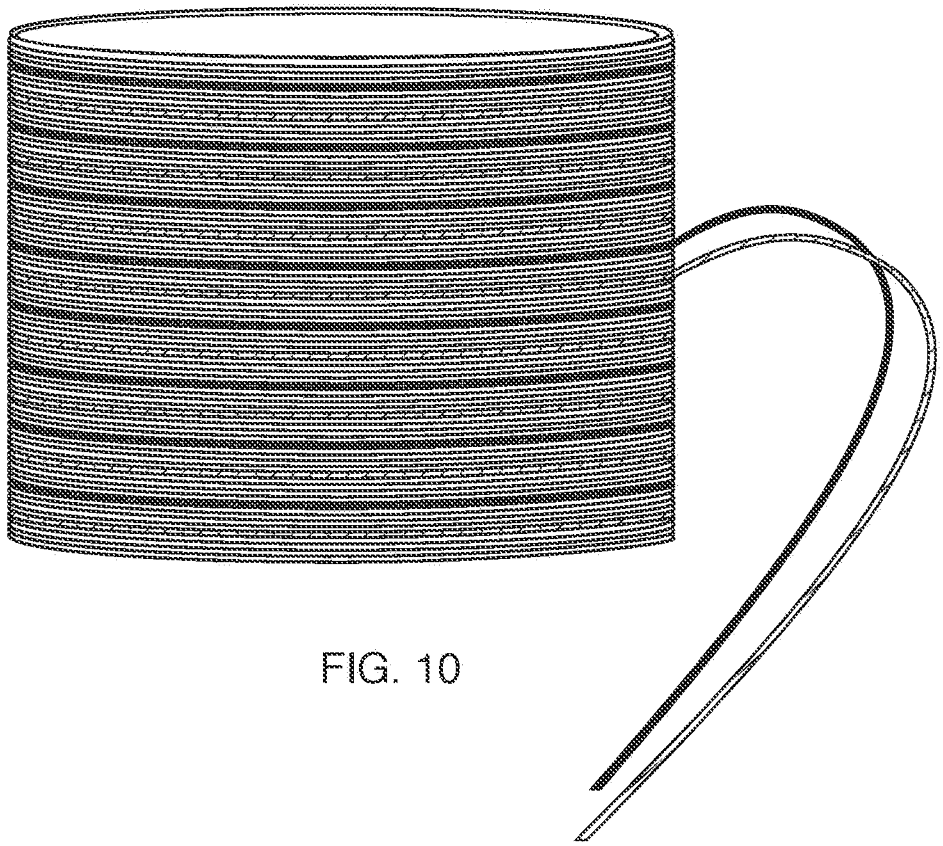
FIG. 10 is a front view of a woven fabric-based apparatus with a cylindrical configuration used for generating a non-thermal microplasma, according to an embodiment of the present disclosure.

In some embodiments, the substrate can comprise a cylindrical configuration with the electrodes forming a double helix profile within the cylindrical configuration (see FIG. 10). In some embodiments, the substrate can include a carbon layer (e.g., including activated charcoal) configured for passively absorbing toxic gases. In some embodiments, the carbon layer can be in the form of woven, knit and/or non-woven textile. In some embodiments, the carbon layer includes activated charcoal.

The electrodes 108 may be composed of any electrically conductive material that may be provided in the form of elongated elements. Hence, various metals, metal compounds or alloys, semiconductors, and conductive polymers may be utilized as the electrodes 108. The electrodes 108 may be provided in the form of yarns, which may be mono-filament or multi-filament yarns. The electrodes 108 may be embedded in, encapsulated in, supported on or in, bound to, attached to, or otherwise secured to the substrate 104 by any suitable technique. Examples of securing the electrodes 108 include, but are not limited to, interlacing or weaving (in woven embodiments), thermal bonding, and chemical bonding (e.g., utilizing an adhesive). The electrodes 108 may have any suitable cross-section as noted above; FIG. 2 illustrates a circular cross-section by way of example only. The length of the electrodes 108 is generally limited only by available fabrication techniques. In one non-limiting example, the characteristic dimension of the electrodes 108 ranges from about 1 μm to about 1 mm (1000 μm). The electrodes 108 are arranged in parallel on the substrate 104 such that a transverse gap (or plasma discharge gap, or discharge gap) is defined between each pair of adjacent electrodes 108. The size of the discharge gap (i.e., the distance between the corresponding pair of adjacent electrodes 108) is depicted in FIG. 1 as width w. In one non-limiting example, the discharge gap ranges from about 10 μm to about 10 cm (100,000 μm). More generally, the characteristic dimension of the electrodes 108 and the size of the discharge gap should be such as to be effective for generating and maintaining a stable two-dimensional microplasma as described herein. In the present context, a "stable" microplasma is generally one that is maintained consistently for as long as operation is desired without arcing or extinction, and which is substantially uniformly distributed throughout the discharge gap between a pair of adjacent electrodes 108. Depending on the application, a small amount of transient arcing events may be acceptable.

The width w of the discharge gap is a nominal or intended width that assumes the parallelism between adjacent pairs of electrodes 108 is very precise. Parallelism between the electrodes 108 is also desirable for generating and maintaining a stable two-dimensional microplasma. If the electrodes 108 of a given pair are exactly parallel over their entire length, then the width w of the discharge gap will be constant over the entire length. In some embodiments, the electrodes 108 are substantially parallel (i.e., may not be exactly parallel). That is, a given electrode 108 may deviate to some degree from exact straightness and still be effective for generating and maintaining a stable two-dimensional microplasma array. This is illustrated in FIG. 1, which shows one of the electrodes 108 deviating from a straight line in the longitudinal direction (the amount of deviation being exaggerated for illustrative purposes). The point of maximum deviation from the straight line is denoted as 8MAX. The size of the discharge gap at this point is the nominal width w plus 8MAX. In some embodiments, the electrodes 108 are parallel to a degree such that each electrode 108 deviates from a straight line in the longitudinal direction by a distance no greater than 10% of the nominal width w of the discharge gap; that is, 8MAX:S 0.10 w. In some other embodiments, the electrodes 108 are parallel to a degree such that each electrode 108 deviates from a straight line in the longitudinal direction by a distance no greater than 100% of the nominal width w of the discharge gap; that is, 8MAX:S w. Accordingly, as used herein the term "parallel" is not limited to "exactly parallel" but instead encompasses "substantially parallel" unless otherwise indicated.

In some embodiments, the electrodes 108 need only to exhibit "local" parallelism as opposed to "global" parallelism. That is, the apparatus 100 may be an elongated or relatively large structure, such as a strip or curtain, with a relatively large number of electrodes 108. For instance, in the apparatus 100 shown in FIG. 1, the substrate 104 may be envisioned as extending over a greater distance in the transverse direction (horizontal from the perspective of FIG. 1), and the electrodes 108 specifically shown may be considered to be located in just one section or region of the extended substrate 104. Depending on the application, the apparatus 100, if flexible, may be conformally disposed on (or may serve as a conformal lining for) an object or structure of complex or rounded geometry, or it may otherwise be configured or supported so as to present folds, bends or pleats (such as a hanging curtain or screen). Alternatively, the substrate 104 of the apparatus 100 may be rigid and have a complex or rounded shape (such as an egg crate, or a container for other types of foods). In all such instances, due to geometric transitions (e.g., deviations from the flatness shown by example in FIG. 2) not every electrode 108 is necessarily parallel to all other electrodes 108 provided with the apparatus 100. However, the apparatus 100 nonetheless may include groups of electrodes 108 that are parallel, such as the group shown in FIG. 1. In such an apparatus 100, the electrodes 108 are considered as exhibiting local parallelism, and the apparatus 100 is capable of generating and maintaining a plurality of stable microplasma arrays over a plurality of sections of regions of the apparatus 100, which may be sufficient for the application or purpose for which the apparatus 100 is being implemented.

In various embodiments, the substrate 104 may be porous to allow for fluids such as gas or smoke-filled air to pass therethrough. In some embodiments, the apparatus 100 can be housed within a chamber (not shown) that further includes a fan or similar other mechanism to push or force smoke-filled air towards or through the porous substrate of the apparatus 100. The provision of a fan or a similar other air-moving mechanism can advantageously accelerate the clearing up of a substantial portion of the opaqueness of smoke within a relatively short period of time. In one embodiment, a smoke clearing system is provided, wherein the smoke clearing system includes the apparatus 100. Smoke clearing system can further include a smoke detector that is configured to automatically detect smoke in the ambient air within a closed environment such as a cockpit or a cabin of an aircraft. Following the detection of smoke by the smoke detector, the smoke clearing system operates to energize (i.e., supply power to the electrode of) the apparatus 100 configured as a textile material to generate a microplasma array. The generated microplasma array can operate to clear up a substantial portion of the translucence or opacity of smoke by removing water vapor, particulate matter and gases as needed. The microplasma array can further operate to remove toxic gases in the ambient air; in one embodiment, the substrate can include carbon yarns that operate to absorb toxic gases (e.g., the carbon yarns can include activated charcoal in one embodiment). In one embodiment, smoke clearing system can further include a housing that encloses the apparatus 100, as well as a fan or similar other mechanism configured for pushing or forcing the smoke-filled air towards, across, or through the porous substrate of the apparatus 100.

In various embodiments, the smoke clearing system including the apparatus as disclosed herein can further comprise additional components such as display interface, hardware and software components. The smoke clearing system can provide for a visual display interface that can be used by a user for tracking the operations of the apparatus such as apparatus 100 as disclosed herein. The smoke clearing system can further include a software application configured to display, on an interactive user interface of a computing device, various parameters associated with the smoke clearing system in general and apparatus 100 in particular. For example, in one embodiment, the application via the visual display can display a condition or status of the textile material that forms part of apparatus 100. In one embodiment, the visual display can alert a user that the smoke detector is at the end of its useful life, or otherwise requires replacement. Smoke clearing system can further include a microcontroller that is in communication with various components of the smoke clearing system including the application operating on a computing device and the visual display. Smoke clearing system can further include a provision for recording and analyzing data related to the apparatus 100 via the microcontroller in communication with, or forming part of, the apparatus 100. The smoking clearing system can further include a computing device that continuously monitors the smoke detection device that forms part of the smoke clearing system. The smoke clearing system can further include one or more sensors to monitor the condition of the apparatus 100. The smoke clearing system can further alarms (audible and visual) to indicate when one or more components of the smoke clearing system are malfunctioning and or otherwise in need of repairs or replacement. The smoke clearing system can furthermore include a manual override setting whereby the apparatus 100 can also be manually operated by a user.

Figure 3:
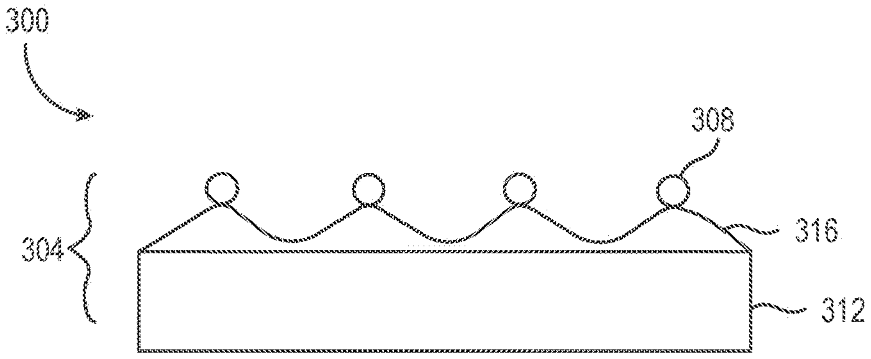
FIG. 3 is a side elevation view of another example of an apparatus for generating a non-thermal microplasma, according to an embodiment of the present disclosure.

FIG. 3 is a side elevation view of another example of an apparatus 300 comprising a textile material and configured for generating a non-thermal microplasma. The apparatus 300 includes a substrate 304 and a plurality of electrodes 308. In this example, the substrate 304 includes two or more layers or components. In the example specifically illustrated, the substrate 304 includes at least one base layer 312 and a corrugated (or fluted) layer 316 disposed on the base layer 312. Each electrode 308 is disposed on a corresponding flute of the corrugated layer 316, in parallel with the other electrodes 308. In the illustrated example, the electrodes 308 are disposed on the apices of the flutes. In other embodiments, the electrodes 308 may be disposed at lower elevations on the flutes (i.e., somewhere in the troughs), so long as such a configuration does not impair the generation and maintenance of a stable microplasma between adjacent pairs of electrodes 308. In other embodiments, more than one electrode 308 may be disposed on a flute. Apparatus 300 may otherwise share same or similar qualities as apparatus 100. As an example, FIG. 3 may be representative of a yarn-based apparatus such as a plasma textile material. In some embodiments, the substrate 304 can a cylindrical configuration with the electrodes forming a double helix profile within the cylindrical configuration. In some embodiments, the substrate 304 can further include a carbon yarn layer configured for passively absorbing toxic gases. In some embodiments, the carbon layer can be in the form of woven, knit and/or non-woven textile. In some embodiments, the carbon layer can include activated charcoal.

Figure 4:
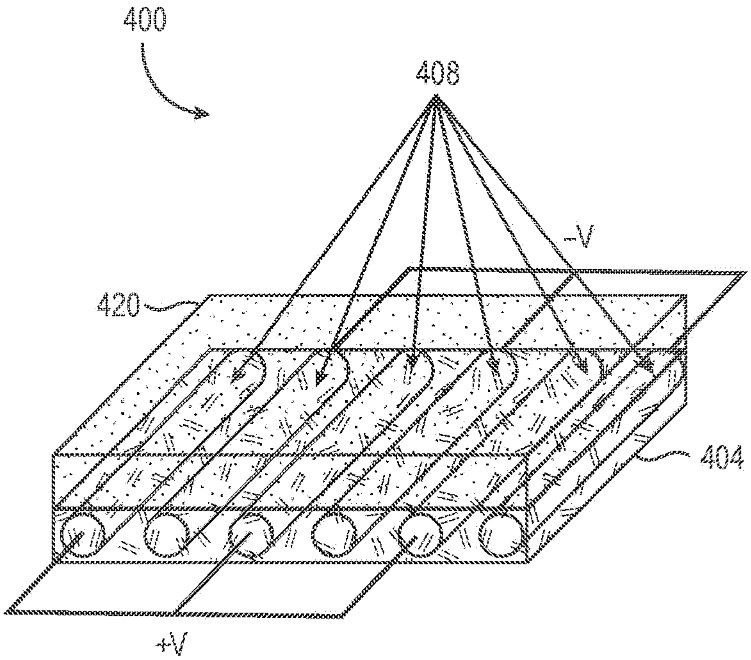
FIG. 4 is a perspective view of another example of an apparatus for generating a non-thermal microplasma, according to an embodiment of the present disclosure.

FIG. 4 is a perspective view of another example of an apparatus 400 for generating a non-thermal microplasma. A plurality of parallel electrodes 408 is embedded in a suitable substrate 404. In one embodiment, the substrate 404 comprises plasma textile material. FIG. 4 schematically shows positive and negative DC voltages being applied to alternating electrodes 408. Utilizing an appropriate structural configuration (e.g., sizes of the electrodes 408 and discharge gaps) and operating (e.g., voltage) parameters, a stable, two-dimensional plasma array 420 is generated between pairs of positively charged electrodes 408 and negatively charged electrodes 408 and above the substrate 404. The microplasma generated by substrate 404 that includes a plasma textile material is referred to as being two-dimensional or planar in the sense that its dominant dimension is the area over which the microplasma extends adjacent to the underlying substrate 404, in comparison to a thickness or height t of the plasma textile. In some embodiments, the thickness t of the plasma textile material above the surface of the substrate 404 ranges from 0.1 mm to 10 mm. In some embodiments, the substrate 404 may include non-conductive elongated elements (e.g., fibers, yarns or threads, not shown) between pairs of positively charged and negatively charged electrodes 408. Apparatus 400 may otherwise share same or similar qualities as apparatus 100.

In various embodiments, the apparatus 400 can be housed within a chamber (not shown) that further includes a fan or similar other mechanism to push smoke-filled air towards, across, or through the porous substrate 404 of the apparatus 400. The provision of a fan (or a mechanism configured to move the ambient air towards, across, or through the porous substrate 404) can advantageously accelerate the clearing up of a substantial portion of the translucence or opacity of smoke. In various embodiments, the substrate of the apparatus 400 may accordingly be porous to allow for fluids such as gas or smoke-filled air to pass therethrough. In one embodiment, a smoke clearing system is provided, wherein the smoke clearing system includes the apparatus 400. Smoke clearing system can further include a smoke detector that operates to automatically detect the presence of smoke in the ambient air, following which the smoke clearing system operates to energize the apparatus 400 comprising a substrate made up of or including plasma textile to generate the microplasma array 420 that operates to clear up a substantial portion of the translucence or opacity caused by smoke by removing water vapor, particulate matter and gases and any appropriate material from the air, as needed. The microplasma array 420 can further operate to remove toxic gases in the ambient air; in one embodiment, the substrate can include a carbon layer that operates to absorb toxic gases. In some embodiments, the carbon layer can be in the form of woven, knit and/or non-woven textile yarn. In some embodiments, the carbon yarn or carbon layer includes activated charcoal.

When the apparatus 400 is energized, a plasma is generated between each pair of positively charged and negatively charged electrodes 408 of the plasma textile material. Depending on the spacing between the electrodes 408, the microplasma array may in effect be continuous in that it comprises all of the individual microplasma arrays generated, as depicted in FIG. 4. Alternatively, the spacing between one pair of positively-charged and negatively-charged electrodes 408 and another electrode pair adjacent to the first pair may be large enough that no plasma is generated between the two electrode pairs, in which case the total microplasma array 420 shown in FIG. 4 may appear as distinct strips of plasma that are spaced apart from each other. The total microplasma array 420 can operate to clearing up of a substantial portion of the translucence or opacity caused by smoke. Accordingly, in at least one embodiment, a smoke detector of the smoke clearing system that includes the apparatus 400 automatically detects the presence of smoke in the ambient air within a closed environment such as, for example, the cabin or cockpit of an airplane, following which the smoke clearing system operates to energize the apparatus 400 to form the microplasma array 420. The microplasma array 420 then operates to clear up a substantial portion of the translucence or opacity of smoke by removing water vapor, particulate matter and appropriate gases from the ambient air to thereby improve the transparency of the ambient air; this may allow passengers and aircraft crew to be able to better view things around them, thereby improving safety. In one embodiment, the fan or similar other mechanism that forms part of the smoke clearing system operates to push or force the smoke-filled air towards, across or through the substrate 404 of the apparatus 400 to accelerate the clearing up of smoke and the absorption, adsorption or the removal or toxic gases within the cabin or cockpit of the airplane; in one embodiment, the substrate can include a carbon layer, for example, in the form of a carbon yarn that includes activated charcoal, that operates to absorb toxic gases. In some embodiments, the carbon layer can be in the form of woven, knit and/or non-woven textile. In some embodiments, the carbon yarn or carbon layer includes activated charcoal.

It will be appreciated that the application of positive and negative DC voltages is schematically shown by example only. More generally, in operation a potential difference is applied between adjacent pairs of electrodes 408. Hence, the magnitude of the voltage applied to the negatively charged electrodes 408 may alternatively be zero, and the negatively charged electrodes 408 may alternatively be depicted as being in signal communication with electrical ground. It will also be appreciated that AC voltages may be applied to the electrodes 408 instead of DC voltages.

Figure 5:
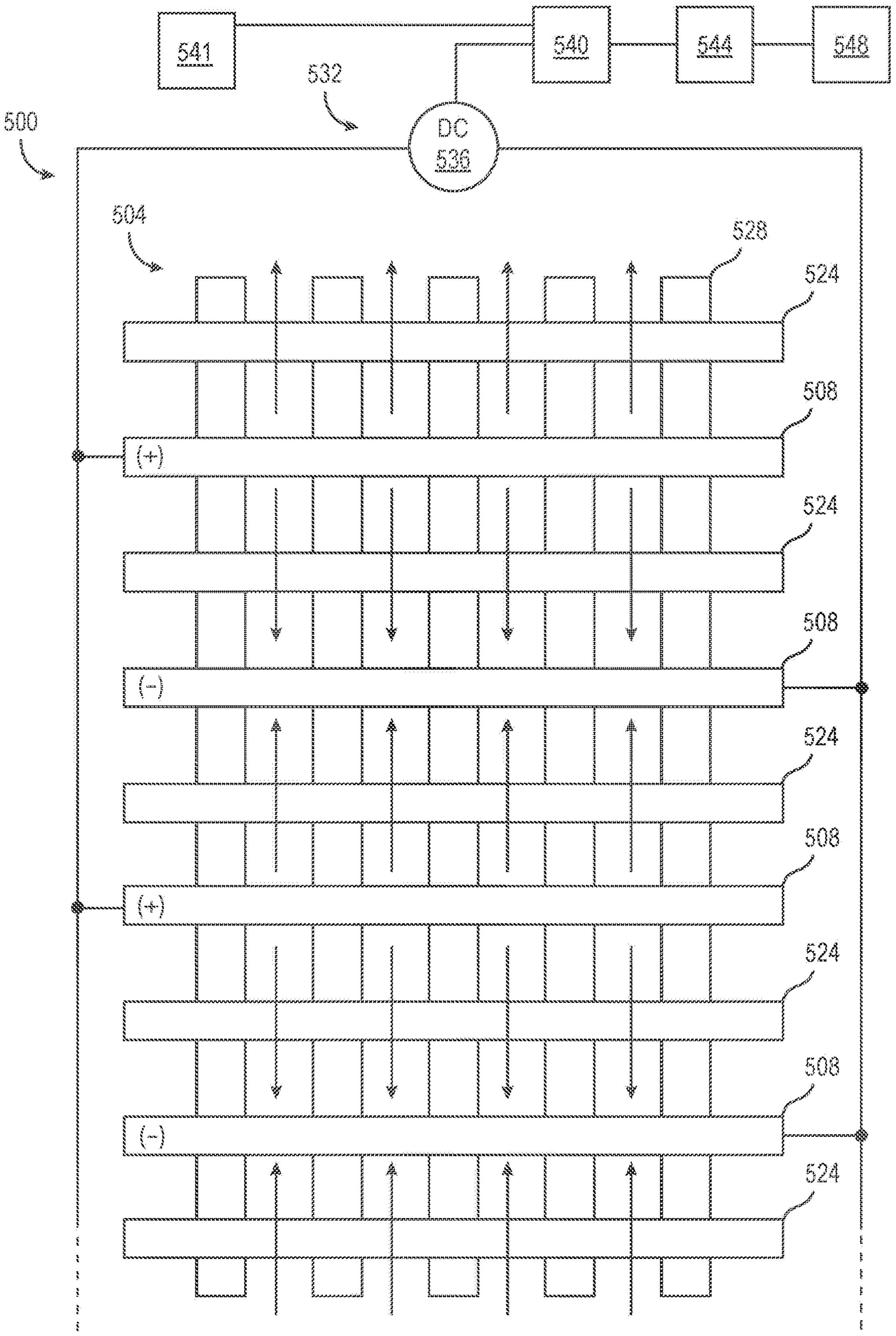
FIG. 5 is a schematic view of another example of an apparatus for generating a non-thermal microplasma, in which the apparatus is driven by DC power, according to an embodiment of the present disclosure.

FIG. 5 is a schematic view of another example of an apparatus 500 for generating a non-thermal microplasma, in which the apparatus 500 is driven by DC power. For reference purposes, in FIG. 5 the longitudinal direction is taken to be the horizontal direction and the transverse direction is taken to be the vertical direction. It will be understood that these directions are considered merely by example only, in view of the arbitrarily chosen perspective or orientation of the apparatus 500 illustrated in FIG. 5. The apparatus 500 may be provided or operated in any orientation. In the illustrated embodiment the apparatus 500 includes a substrate 504 that is, or includes, a two-dimensional array or grid of elongated non-conductive elements 524 and 528 (e.g., fibers or threads) running in the longitudinal and transverse directions, respectively. The apparatus 500 also includes a plurality of parallel conductive elongated elements (or electrodes) 508 running in the longitudinal direction. One or more longitudinal non-conductive elements 524 may be interposed between each adjacent pair of electrodes 508. The substrate 504 may be, for example, a woven fabric, although the interlacing of the elongated non-conductive elements 524 and 528 is not specifically shown. As a further example, in making the fabric the longitudinal direction may be the warp direction and the transverse direction may be the weft direction. The electrodes 508 may also be woven over and under (not shown) the transverse elements 528, along with the longitudinal non-conductive elements 524. In at least one embodiment, the non-conductive elements 524 and/or conductive elements 508 can comprise one or more of fibers and yarns, wherein the fibers/yarns comprise one or more of: a woven, knit and non-woven textile. As in other embodiments disclosed herein, the apparatus 500 may represent one portion or section of a larger apparatus that includes more conductive and non-conductive elements 508, 524 and 528 than those illustrated by example in FIG. 5.

The apparatus 500 may also include a means or device 532 configured for applying a voltage to the electrodes 508 under conditions suitable for generating and sustaining a stable microplasma between each adjacent pair of electrodes 508. In FIG. 5, the device 532 is schematically depicted as including a DC voltage source 536 in signal communication with the electrodes 508 via any suitable types of electrical current-carrying components (e.g., wires, buses, interconnects, contact pads, terminals, etc.). Voltages of positive and negative polarity are applied to alternating electrodes 508 in the manner shown in FIG. 5. As a result, electrical fields are generated between pairs of electrodes 508 in the orientations shown by vector arrows in FIG. 5. The operating parameters of the voltages/electrical fields applied are set, tuned or adjusted to produce the microplasma. In some embodiments, the voltage source is configured for applying a DC voltage at a magnitude (absolute) ranging from 10 V to 100 kV (100,000 V). The device 532 may be configured for applying the DC voltage continuously or in pulses. In some embodiments, the pulses are applied at a frequency ranging from 0.1 Hz to 1 MHz ($1\times10^6$ Hz). In some embodiments, a preferred range of frequency is from 10 kHz to 100 kHz. In some embodiments, a more preferred range is from 100 Hz to 10 kHz. In some embodiments, the wattage may range from 0.001 W/cm$^2$ to 1 W/cm$^2$. In some embodiments, each pulse has a duration ranging from 1 ns to 1 s ($1\times10^9$ ns). In some embodiments, a preferred range of pulse duration is from 10 ns to 1 ms. In some embodiments, a more preferred range is from 10 ns to 1 μs.

The device 532 capable of applying a voltage and/or apparatus 500 may include any other components desirable or needed for generating and maintaining a stable non-thermal microplasma and/or for providing additional functionality. In at least one embodiment, device 532 configured for applying a voltage forms part of the smoke clearing system as mentioned herein. For example, FIG. 5 schematically illustrates additional components of the smoke clearing system including an optional pulse/timing controller 540 for controlling the operation of the DC voltage source 536 in pulsed embodiments; a user input 544 that provides one or more user inputs such as, for example, an on/off switch, a switch for selecting between continuously applied and pulsed voltage, and one or more other user-operated controls for adjusting the parameters of the DC voltage, such as voltage magnitude, pulse duration and frequency, etc.; and a power source or regulator 548 such as a battery, an adapter for rectifying AC line power to DC power, etc. The smoke clearing system can further include hardware, firmware, circuitry, software and/or other structures needed to implement the foregoing components as are readily apparent to persons skilled in the art. A suitable fault-sensing device may also be included as a component of the smoke clearing system for detecting a fault in operation and may include automatic shut-down functionality. Accordingly, the FIG. 5 embodiment can be advantageously used to clear up smoke in circumstances wherein the power supply that energizes the apparatus 500 is DC power. Accordingly in at least one embodiment, a smoke detector 541 of the smoke clearing system that includes the apparatus 500 automatically detects the presence of smoke in the air within, for example, the cabin or cockpit, following which the smoke clearing system operates to energize the apparatus 500 to form a microplasma array. The microplasma array then operates to clear up a substantial portion of the translucence or opacity caused by smoke by removing water vapor, particulate matter and any other appropriated gases, as needed, to accomplish the objective of clearing a substantial portion of the translucence or opacity caused by smoke. In one embodiment, the microplasma array can further operate to remove toxic gases in the ambient air; in one embodiment, the substrate can include a carbon layer, for example, in the form of a carbon yarn, that operates to absorb toxic gases. In some embodiments, the carbon layer can be in the form of woven, knit and/or non-woven textile. In some embodiments, the carbon yarn or carbon layer includes activated charcoal. In one embodiment, the fan or similar other mechanism that forms part of the smoke clearing system operates to push or force the smoke-filled air towards or through the substrate of the apparatus 500 to accelerate the clearing up of smoke and the removal of toxic gases within the cabin or cockpit of the airplane. In one embodiment, the apparatus 500 is also configured for clearing up smog in a localized area of an outside (i.e., open) environment.

Figure 6:
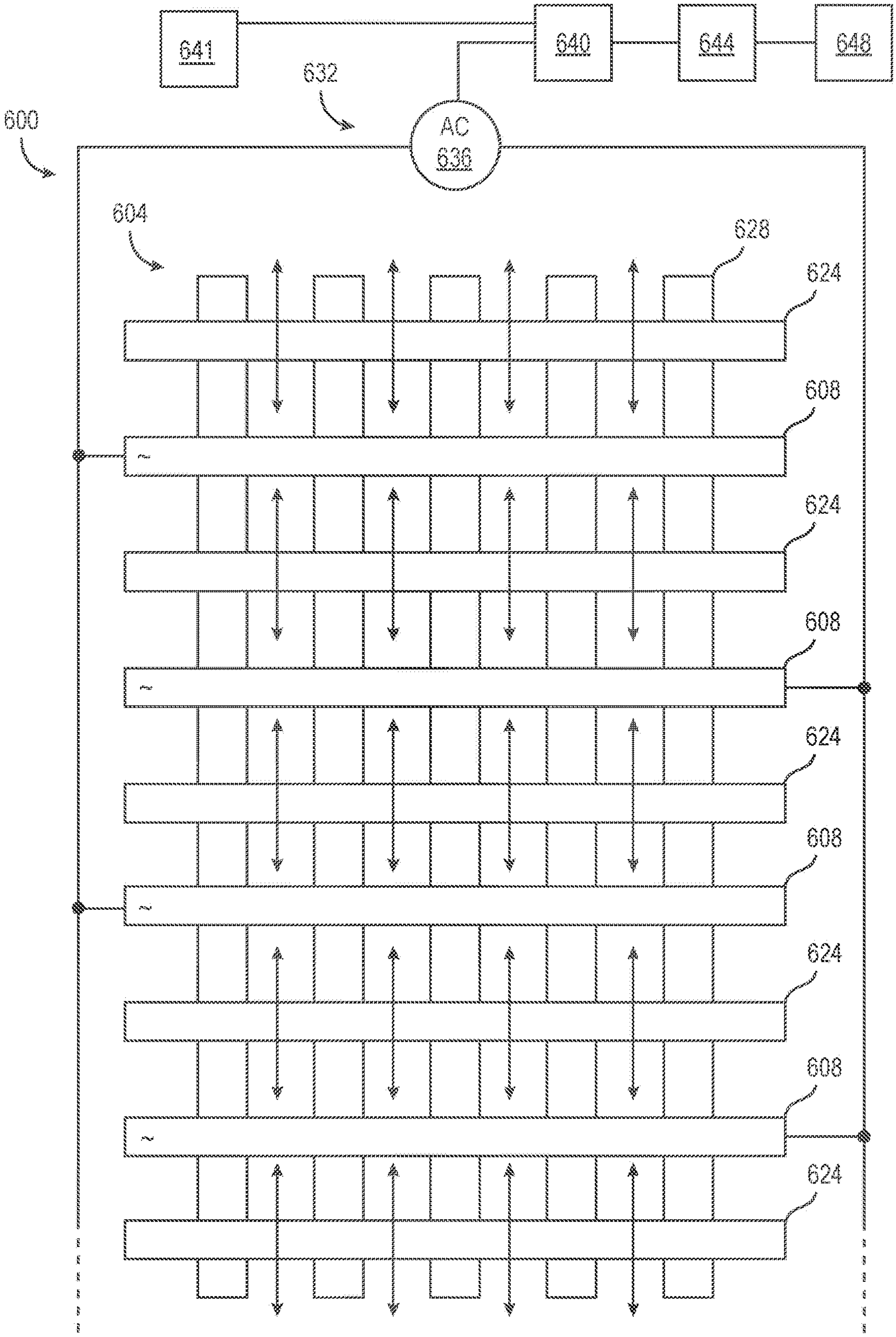
FIG. 6 is a schematic view of another example of an apparatus for generating a non-thermal microplasma, in which the apparatus is driven by AC power, according to an embodiment of the present disclosure.

FIG. 6 is a schematic view of another example of an apparatus 600 for generating a non-thermal microplasma, in which the apparatus 600 is driven by AC power. Similar to that shown in FIG. 5, the apparatus 600 includes a substrate 604 that is, or includes, a two-dimensional array or grid of elongated non-conductive elements 624 and 628 running in the longitudinal and transverse directions. The apparatus 600 also includes a plurality of parallel conductive elongated elements (or electrodes) 608 running in the longitudinal direction. In this AC-driven embodiment, each electrode 608 may include a conductive core that is coated, sheathed or otherwise surrounded by an insulating or dielectric layer, in which case the microplasma may be generated in form of a dielectric barrier discharge. One or more longitudinal non-conductive elements 624 may be interposed between each adjacent pair of electrodes 608.

The apparatus 600 can form part of the smoke clearing system in at least one embodiment; the smoke clearing system may further include additional components such as a means or device 632 configured for applying a voltage to the electrodes 608 under conditions suitable for generating and sustaining a stable microplasma between each adjacent pair of electrodes 608. In FIG. 6, the device 632 is schematically depicted as including an AC voltage source 636 in signal communication with the electrodes 608 via any suitable types of electrical current-carrying components. The respective terminals of the AC voltage source 636 are placed in signal communication with alternating electrodes 608 in the manner shown in FIG. 6. As a result, alternating electrical fields are generated between pairs of electrodes 608 as shown by double-headed vector arrows in FIG. 6, indicating the periodic nature of the applied voltage in this embodiment. The operating parameters of the voltages/electrical fields applied are set, tuned or adjusted to produce the microplasma. In some embodiments, the AC voltage source 636 is configured for applying an AC voltage at a magnitude (zero-to-peak) ranging from 10 V to 100 kV (100,000 V). In some embodiments, the voltage source is configured for applying the AC voltage at a frequency ranging from 1 Hz to 1 MHz ($1\times10^6$ Hz). The AC voltage signal applied may be based on any waveform function suitable for producing a stable microplasma such as, for example, pure sinusoidal, modified sinusoidal, square wave, sawtooth, or a composite of two or more different types of waveforms. In some embodiments, a preferred range of voltage is 1 kV to 50 kV RMS. In some embodiments, a more preferred range is 10 kV to 20 kV RMS.

The smoke clearing system comprising device 632 configured for applying a voltage and/or apparatus 600 may additionally include any other components desirable or needed for generating and maintaining a stable non-thermal microplasma and/or for providing additional functionality associated with clearing up the ambient air that includes smoke and other toxic gases. For example, FIG. 6 schematically illustrates a controller or driver 640 for controlling the operation of the AC voltage source 636, such as a frequency synthesizer or waveform generator; a user input 644 that provides one or more user inputs such as, for example, an on/off switch, a switch for selecting between different types of waveforms, and one or more other user-operated controls for adjusting the parameters of the AC voltage, such as voltage magnitude, frequency, etc.; and a power source 648 or regulator such as an AC adapter, or a battery in conjunction with an AC-to-DC converting component (e.g., a power inverter). The hardware, firmware, circuitry, software and/or other structures needed to implement the foregoing components are readily apparent to persons skilled in the art. A suitable fault-sensing device may also be included as a component for detecting a fault in operation and may include automatic shut-down functionality. Accordingly, the FIG. 6 embodiment can be advantageously used to clear up smoke and to remove toxic gases in circumstances wherein the power supply that energizes the apparatus 600 is AC power. Accordingly in at least one embodiment, a smoke detector 641 of the smoke clearing system that includes the apparatus 600 automatically detects the presence of smoke in the air within, for example, the cabin or cockpit, following which the smoke clearing system operates to energize the apparatus 600 to form a microplasma array. The microplasma array then operates to clear up a substantial portion of the translucence or opacity caused by smoke by removing water vapor, particulate matter and other gases, as needed, to clear up a substantial portion of the translucence or opacity. The microplasma array can further operate to remove toxic gases in the ambient air; in one embodiment, in one embodiment, the substrate can include a carbon layer, for example, in the form of a carbon-containing yarn, that operates to absorb toxic gases. In some embodiments, the carbon layer can be in the form of woven, knit and/or non-woven textile. In some embodiments, the carbon yarn or carbon layer includes activated charcoal. In one embodiment, the fan or similar other mechanism that forms part of the smoke clearing system operates to push or force the smoke-filled air towards, across, or through the substrate of the apparatus 500 to accelerate the clearing up of smoke and/or the removal of toxic gases within the cabin or cockpit of the airplane.

Figure 7:
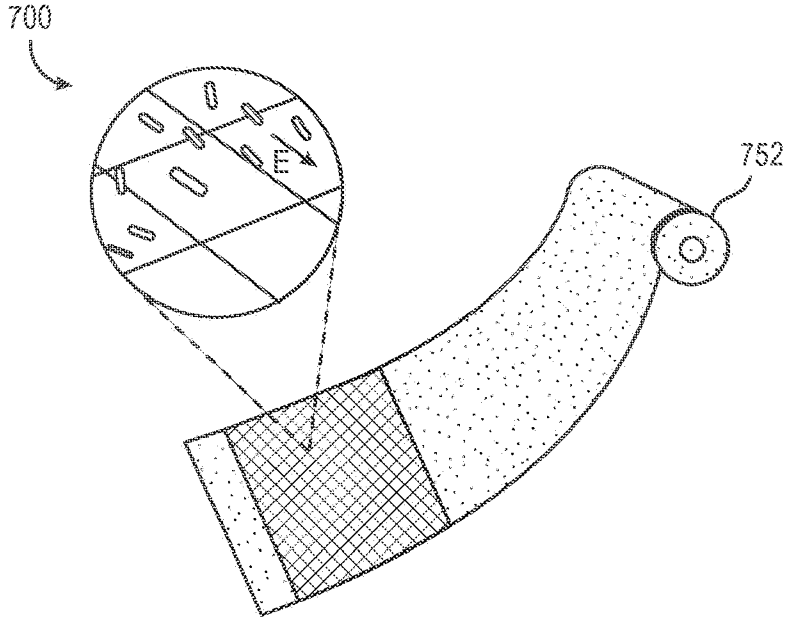
FIG. 7 is a perspective view of an example of a flexible apparatus provided in the form of a roll of woven yarn, nonwoven yarn, or other flexible composite, according to an embodiment of the present disclosure.

FIG. 7 is a perspective view of an example of a flexible apparatus 700 provided in the form of a roll 752 of plasma textile that comprises one or more of woven fabric, nonwoven fabric, or other flexible conductive/non-conductive (or electrode/substrate) composite. A selected length of the apparatus 700 may be unrolled, separated from the roll 752, and further sized and processed as needed for a particular smoke clearing application. Depending on the level of integration of the components utilized as the voltage-applying device, one or more of these components may need to be operatively attached to the apparatus 700 after removing and sizing the selected length from the roll 752. In at least one embodiment, the microplasma array generated by the apparatus 700 can further operate to remove toxic gases in the ambient air; in one embodiment, the roll 752 can include a carbon layer, for example, in the form of a carbon yarn, that operates to absorb toxic gases. In some embodiments, the carbon layer can be in the form of woven, knit and/or non-woven textile. In some embodiments, the carbon yarn or carbon layer includes activated charcoal.

The plasma generated by the various embodiments of the smoke clearing system and apparatus disclosed herein may be any type of non-thermal plasma that may be generated with the small dimensions associated with a microplasma array. Examples include, but are not limited to, corona discharges, dielectric barrier discharges, surface wave discharges, or radio frequency (RF) discharges. The microplasma may be generated under standard ambient conditions, e.g., atmospheric pressure and room temperature. The microplasma may generally comprise a mixture of neutral components (atoms and/or molecules), energetic or excited species (e.g., metastable species, species in a Rydberg state, etc.), free electrons and photons, and in some embodiments may further include ionic species. Depending on the application or purpose for which the microplasma is implemented, any one or more of the foregoing components of the microplasma may be considered as "reactive" species. Moreover, the types of species making up the plasma depend on the plasma medium from which the microplasma is generated. For example, the microplasma as disclosed herein is envisioned to have applications in a typical ambient environment within a closed HVAC (heating, ventilation and air-conditioning) environment such as a cockpit or a cabin of an airplane that happens to include smoke caused, for example, by an electrical short circuit, in which case the microplasma may be an "air plasma," which predominantly includes oxygen and nitrogen species and may include lesser amounts of other species such as water vapor, hydrogen, hydroxyl, ozone, carbon dioxide, and other gases and particulate matter generated as byproducts of combustion.

Various embodiments of the microplasma-generating apparatus disclosed herein may be suitable for a wide variety of applications besides clearing up of smoke within a closed environment such as a cockpit or a cabin of an aircraft. In some embodiments, the microplasma as described herein may be generated in a controlled environment such as an enclosed space or an otherwise closed environment in which one or more specific gases may serve as the plasma medium such as, for example, oxygen, nitrogen, helium, xenon, argon, neon, krypton, carbon dioxide and/or ammonia. Depending on the composition of the plasma medium, the microplasma may further include free radicals, molecular fragments, and/or monomers, one or more of which may serve as active or reactive species. The apparatus and system as described herein can be utilized to treat a fluid such as air by exposing the fluid to the microplasma array to produce a desired reaction or change. Examples of treatments or reactions include, but are not limited to, oxidation, reduction, decontamination, disinfection, sterilization, lysis, biocide or deactivation of biological organisms (e.g., antimicrobial, antiviral, or antifungal activity), depolymerization, denaturing, binding, surface functionalization, and fragmentation of biopolymers such as nucleic acids, carbohydrates, and the like. For instance, the reactive oxygen-inclusive species of an air plasma (e.g., 0, OH, and 03) may be effective for inducing many types of chemical oxidation and biological deactivation processes.

The inset of FIG. 7 illustrates an example of utilizing a generated microplasma to remove particles and combustion byproducts from smoke generated within a closed environment such as a cabin or a cockpit of an airplane. The smoke clearing system can be equally applied to cruise ships, cargo ships, submarines, passenger trains, freight trains, tour buses, coaches, and even to fixed buildings and other superstructures having internal environments with controlled HVAC airflows that can benefit from the quick clearing up of smoke caused by a fire or a fireless combustion reaction.

The smoke clearing system can include an apparatus provided in the form of a two-dimensional array of elongated elements as described above and illustrated in FIGS. 5 and 6, whereby the apparatus serves as a mesh, screen or filter. In such an embodiment, the microplasma generated by the apparatus treats the fluid, such as air, as the fluid flows through the array or as the fluid flows parallel to the array in proximity to the electrodes. The apparatus may alternatively be provided with a solid or continuous substrate such as described above and illustrated in FIG. 3, in which case the microplasma may treat the fluid as the fluid flows parallel to the substrate in proximity to the electrodes. However, for smoke clearing applications, the apparatus in the form of a mesh, screen or filter may be preferable to an apparatus in the form of a solid or continuous substrate. In some embodiments, a generally continuous substrate may be porous, enabling the microplasma to treat fluid as the fluid flows through the thickness of the substrate via the pores.

In various embodiments including smoke clearing embodiments, the apparatus may be utilized as a filtering or decontamination device to remove particles, toxic gases, or other undesired components (e.g., sub-micron dust particles, biological agents, chemical agents, biochemical agents, etc.) from an air environment that includes smoke. The mechanism for removal may entail, for example, electrostatic forces. Exposure to charged species of the microplasma may lead to modification and charge accumulation on the surfaces of inorganic or organic components in the fluid, whereby these components are electrostatically attracted to the energized electrodes and thus may be trapped and removed from the fluid. In other embodiments, the mechanism for removal may entail chemical or electrochemical binding with, capturing by, or retention on one or more reactive species of the microplasma. In embodiments where the apparatus is integrated with a housing or container, the microplasma may be utilized to treat the air inside the housing/container and/or biofilms residing on the surfaces of foods proximate to the microplasma.

Figure 8:
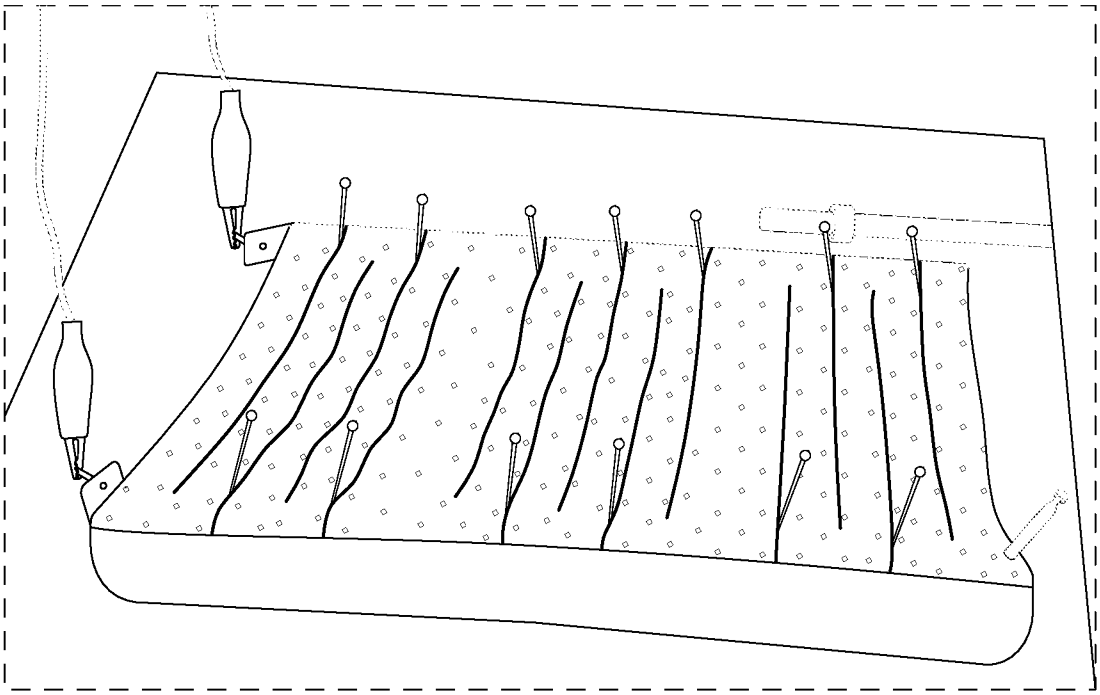
FIGS. 8 and 9 are photographs of other examples of a woven fabric-based apparatus for generating a non-thermal microplasma, according to an embodiment of the present disclosure.
Figure 9:
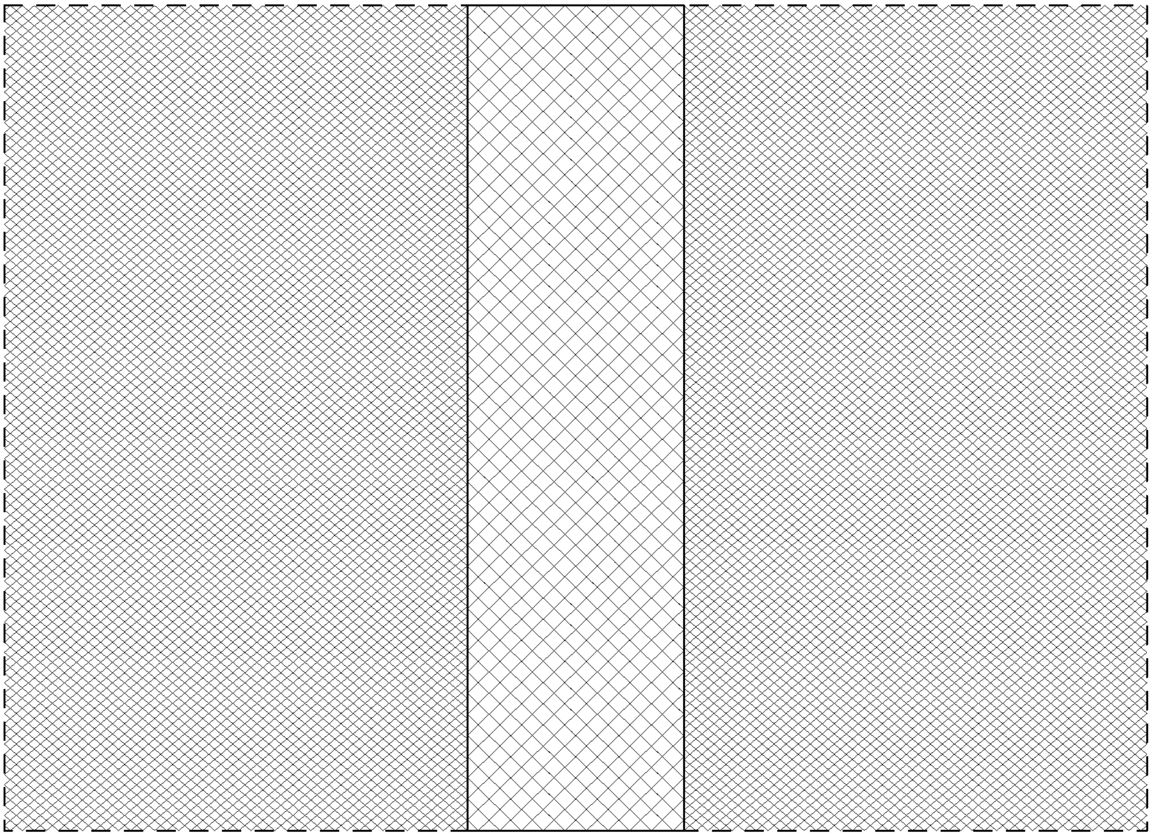

FIGS. 8 and 9 are photographs of examples of an apparatus for generating a non-thermal microplasma, in which the apparatus was produced as a woven fabric. In one embodiment, the fabric included 50 μm stainless steel monofilament yarn and 650/144 denier polypropylene. The warp consisted of the stainless steel and polypropylene, while the filling (weft) yarn was polypropylene. The warp density was 48 ends per inch, and the filling was 25 picks per inch. The stainless-steel yarns were spaced ¼ inch apart in the warp or 1 in every 12 yarns. The base fabric was plain weave, and then at the ends the stainless-steel yarns were floated on top and bottom (alternating) so that every other conductive yarn was separated. In this manner, voltage could be applied to every other yarn to produce plasma. Voltages ranging from 1 to 20 kV were applied to the fabric in atmospheric-pressure air and argon gas. FIGS. 8 and 9 show the glowing plasma when a voltage is applied. In FIG. 8, three spaced-apart groups of electrodes were woven with the fabric, thereby producing three distinct plasma arrays. In FIG. 9, two electrodes (running in the vertical direction) were woven with a strip of fabric. The bright "dots" indicate locations at which the electrodes are visible from the perspective of FIG. 9, i.e., locations at the which the electrode are running above the non-conductive fibers with which they are interlaced.

FIG. 10 is an illustration of an apparatus for generating a non-thermal microplasma, in which the substrate has a cylindrical configuration. In this configuration, the electrodes form a double helix profile within or on the cylindrical configuration of the substrate.

Figure 11:
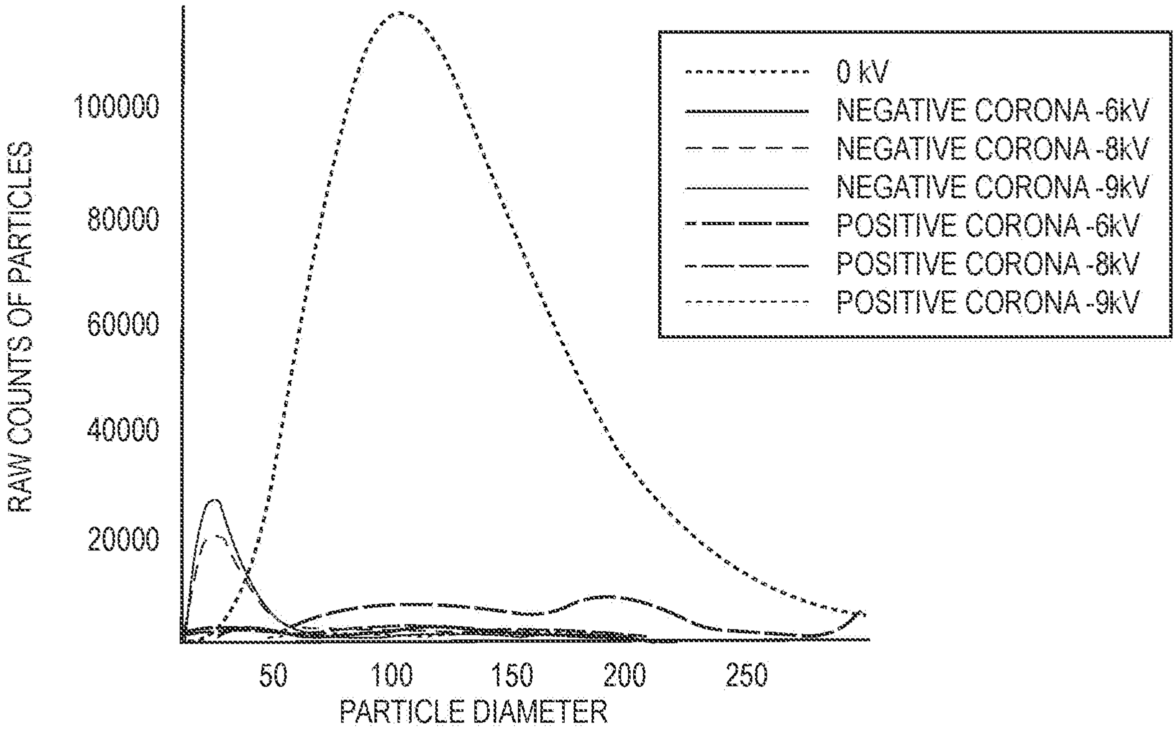
FIG. 11 is a set of plots of particle count as a function of particle diameter for several microplasmas generated at different DC voltages, according to an embodiment of the present disclosure.

FIG. 11 is a set of plots of particle count as a function of particle diameter for several microplasma arrays generated at different DC voltages. In this experiment, a microplasma-generating apparatus was fabricated based on a woven textile as described above. The apparatus was set up as a filter through which a stream of air carrying sodium chloride particles was flowed. Particles allowed to pass through the filter were characterized using an aerosol impactor. The top trace corresponds to no microplasma being generated, resulting in an abundant distribution of particles passing through the filter. By comparison, all other traces correspond to a microplasma being generated at various voltages (−6, −8, −9, +6, +8 and +9 kV). It can be seen that application of the microplasma can be very effective in removing the sodium chloride particles from the air stream, by means of electrostatic attraction to the energized electrodes integrated with the fabric matrix of the filter.

Depending on a particular application, the various apparatus described above and illustrated in the Figures may be installable in a permanent manner at a specific site. In some embodiments, the various apparatus described above and illustrated in the FIG.s can be portable and thus usable in different locations and operating environments. Apparatus configured for fixed installations may nonetheless be configured for easy replacement. For example, after each smoke-clearing event use, the apparatus forming part of the smoke clearing system may be cleaned up or the components therein replaced to thereby return the apparatus to its full functionality.

In various embodiments, a plasma textile forming part of the smoke clearing system and/or apparatus may be fabricated in two basic configurations—a flat configuration and a curved configuration. Accordingly, in some embodiments, the plasma textile can have a cylindrical configuration that includes two conductive yarns in the form of a double helix. For example, in circular weft knitting, when two feeds are comprised of conductive yarns and the rest are non-conductive insulating yarns (such as fiberglass or an electret material), it is possible to knit the plasma textile in the form of a tube or cylinder, for example, of 10 to 12 inches in diameter with the conductive yarns forming a double helix. When a potential is applied across the two conductive yarns of the cylindrical plasma textile, a plasma or microplasma is formed such that it covers the surface of the cylinder. In at least one embodiment, the cylindrical plasma textile can include a perforated non-conducting tube on the inside to keep the plasma textile material stretched in the form of a cylinder and hold its shape. In at least one embodiment, the cylindrical plasma textile can be capped on one end of the cylinder such that air entering the other end would be filtered through the knit plasma-textile structure.

In at least one embodiment, the plasma textile can further include a knit carbon yarn integrated therein to form a carbon yarn plasma textile. The carbon can accordingly perform a function similar to that of the plasma in that the carbon in the knit carbon yarn can operate to collect gases from the air as well as particulate matter from the air to thereby clear the smoke in a closed environment to thereby improve visibility. The carbon present in the knit carbon yarn can further operate to oxidize the airborne contaminants such as VOCs and odor compounds.

In at least one embodiment, the apparatus comprises a fibrous substrate comprising non-conductive fibers, and a plurality of elongated, substantially parallel electrodes disposed on the substrate arranged as one or more pairs of adjacent electrodes, wherein a discharge gap is defined between each pair. The apparatus also includes a device configured for applying a voltage between each pair such that a non-thermal microplasma is generated in the corresponding discharge gap.

In some embodiments, each electrode has a characteristic dimension ranging from 1 μm to 1 mm. In some embodiments, each discharge gap has a width in a direction transverse to the electrodes, and the width ranges from 10 μm to 10 cm. In some embodiments, the discharge gap can have a width in a direction transverse to the electrodes that ranges from 1 μm to 1 mm. In various embodiments, each electrode is elongated in a longitudinal direction, and deviates from a straight line in the longitudinal direction by no more than 10% of the discharge gap.

In some embodiments, the voltage-applying device comprises a voltage source in signal communication with the electrodes. In some embodiments, the voltage source is configured for applying a DC voltage between each pair of adjacent electrodes; in others, the voltage source is configured for applying the DC voltage in pulses. In some embodiments, the DC voltage source is configured for applying the DC voltage at a magnitude ranging from 10 V to 100 kV. In some embodiments, the DC voltage source is configured for applying pulses at a frequency ranging from 0.1 Hz to 1 MHz. In some embodiments, the DC voltage source is configured for applying pulses with a duration ranging from 1 ns to 1 s. In some embodiments, the DC voltage source is configured for applying a DC voltage of one polarity to one electrode and a DC voltage of zero or opposite polarity to the other electrode, and wherein the same polarity is applied to alternating electrodes.

In some embodiments, the voltage source is configured for applying an AC voltage between each pair of adjacent electrodes. In some embodiments, the AC voltage source is configured for applying the AC voltage at a peak magnitude ranging from 10 V to 100 kV. In some embodiments, the AC voltage source is configured for the voltage source is configured for applying the AC voltage at a frequency ranging from 1 Hz to 1 MHz. In some embodiments, each electrode receiving power from the AC voltage source comprises an electrically conductive core surrounded by a dielectric material.

In some embodiments, the non-conductive fibers of the substrate comprise a two-dimensional array of elongated longitudinal elements spaced apart from each other and extending in a longitudinal direction, and elongated transverse elements spaced apart from each other and extending in a transverse direction angled relative to the longitudinal direction. The electrodes extend in the longitudinal direction. In some embodiments, the longitudinal elements can be disposed between each pair of adjacent electrodes. In some embodiments, the substrate comprises a woven fabric in which the longitudinal elements extend in a warp direction and the transverse elements extend in a weft direction, and the electrodes extend in the warp direction.

A method for fabricating an apparatus for generating a non-thermal microplasma can include arranging a plurality of elongated, substantially parallel electrodes on a fibrous substrate as one or more pairs of adjacent electrodes, wherein a discharge gap is defined between each pair. The method can further include placing a voltage source in signal communication with the electrodes such that a voltage can be applied between each pair that generates a non-thermal microplasma in the corresponding discharge gap. The method can also include securing the electrodes to the substrate by interlacing fibers of the substrate, inlaying the electrodes into a knit substrate, forming the electrodes as a knit structure with loops, thermal bonding, or chemical bonding.

In some embodiments, a method for generating a non-thermal microplasma can include applying a voltage between one or more pairs of adjacent electrodes disposed on a substrate, at a voltage magnitude sufficient to ignite a two-dimensional non-thermal microplasma in a discharge gap between each pair of adjacent electrodes. The method can further include continuing to apply the voltage at a voltage magnitude sufficient to maintain the non-thermal microplasma for a desired period of time. In various embodiments, the voltage is applied under ambient temperature and pressure conditions.

In some embodiments, for each pair of adjacent electrodes, applying the voltage comprises applying a DC voltage of one polarity to one electrode and a DC voltage of zero or opposite polarity to the other electrode, and wherein the same polarity is applied to alternating electrodes. In some embodiments, the substrate is a mesh of non-conductive elongated elements. In some embodiments, the substrate is a nonwoven fabric in which the electrodes are integrated.

In some embodiments, an apparatus for generating a non-thermal microplasma includes a fibrous substrate comprising non-conductive fibers, and plurality of elongated, substantially parallel conductive fibers, wires, or electrodes disposed on or in the substrate as one or more pairs of adjacent electrodes, wherein a discharge gap is defined between each pair. The apparatus also includes a device configured for applying a voltage between each pair, such that a non-thermal microplasma is generated in the corresponding discharge gap for the purpose of collecting airborne particulates. In some embodiments, the applying voltage is supplied by a battery or charged capacitor to allow the device to be mobile.

In some embodiments, the voltage applying the device comprises a voltage source in signal communication with the electrodes. In some embodiments, the non-conductive fibers of the substrate comprise a woven, knit or non-woven textile. In some embodiments, the substrate is selected from a group of consisting of flame-retardant fibers, fiberglass, or aramids. In some embodiments, the textile substrate can be removed and cleaned and subsequently reused. In some embodiments, the apparatus be stored in a rolled-up configuration and then deployed. In some embodiments, the non-conductive substrate can be flat or curved. Accordingly, the substrate can have a flat disposition or a curved disposition. In some embodiments, the apparatus does not exhibit a most penetrating particle size when subjected to solid or liquid particles. In some embodiments, the substrate of apparatus also includes a carbon layer, for example, in the form of a carbon yarn, that operates to absorb toxic gases. In some embodiments, the carbon layer can be in the form of woven, knit and/or non-woven textile. In some embodiments, the carbon yarn or carbon layer includes activated charcoal.

In some embodiments, an apparatus for generating a non-thermal microplasma includes an existing fibrous filter, and a plurality of elongated, substantially parallel conductive fibers, wires, or electrodes disposed on or in the substrate as one or more pairs of adjacent electrodes, wherein a discharge gap is defines between each pair. The apparatus also includes a device configured for applying a voltage between each pair, such that a non-thermal microplasma is generated in the corresponding discharge gap for the purpose of collecting airborne particulates.

Various embodiments of the presently disclosed subject matter can accordingly reduce the translucence or opacity caused by smoke within a closed environment.

According to at least one embodiment, a method for treating a fluid such as ambient air, for example, comprises generating a non-thermal microplasma by applying a voltage between one or more pairs of adjacent electrodes disposed on a substrate, at a voltage magnitude sufficient to ignite a two-dimensional non-thermal microplasma in a discharge gap between each pair of adjacent electrodes; and exposing the fluid to energetic species of the microplasma by flowing the fluid through at least one pair of adjacent electrodes whereby particle matter and/or one or more gases are removed from the ambient air.

In some embodiments, exposing the fluid such as, for example, air to energetic species of the microplasma by flowing the fluid through at least one pair of adjacent electrodes triggers a reaction selected from the group consisting of oxidation, reduction, decontamination, sterilization, lysis, biocide, depolymerization, denaturing, binding, surface functionalization, biopolymer fragmentation, nucleic acid fragmentation, and a combination of two or more of these. In some embodiments, exposing the fluid to energetic species of the microplasma by flowing the fluid through at least one pair of adjacent electrodes triggers the charging of a particle of the fluid, wherein the particle is removed from the fluid by electrostatic attraction to at least one of the electrodes.

According to one or more embodiments, the component is a battery or a charged capacitor, wherein the apparatus is configured for mobility whereby the self-contained and self-sufficient apparatus can be moved to a remote location and deployed at the remote locations precluding the need for additional infrastructure or other support equipment.

While embodiments of the invention have been described with regard to certain closed environment applications, the embodiments are equally application to virtually any situation where the clearing up of smoke is required or is beneficial. For example, the invention can be applied in indoor and outdoor auditoriums, theaters, convention centers, schools, hospitals, army bases, hostels, hotels, restaurants, factories, industrial buildings, warehouses, high rise buildings, homes including multifamily housing, office buildings, and even in open environments where the removal of gases and particulate matter from the air, for example, to improve visibility is desired or to remove toxic particles. Accordingly, various land based fixed installations can benefit from the use of embodiments disclosed herein for clearing up the smoke created by fire as quickly as possible so that the occupants of such installations can be evacuated safety and in short duration of time.

For purposes of the present disclosure, it will be understood that when a layer (or coating, film, region, substrate, component, device, or the like) is referred to as being “on” or “over” another layer, that layer may be directly or actually on (or over) the other layer or, alternatively, intervening layers (e.g., buffer layers, transition layers, interlayers, sacrificial layers, etch-stop layers, masks, electrodes, interconnects, contacts, or the like) may also be present. A layer that is “directly on” another layer means that no intervening layer is present, unless otherwise indicated. It will also be understood that when a layer is referred to as being “on” (or “over”) another layer, that layer may cover the entire surface of the other layer or only a portion of the other layer. It will be further understood that terms such as “formed on” or “disposed on” are not intended to introduce any limitations relating to particular methods of material transport, deposition, fabrication, surface treatment, or physical, chemical, or ionic bonding or interaction.

In general, terms such as “communicate” and “in . . . communication with” (for example, a first component “communicates with” or “is in communication with” a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

Monitor I control algorithms associated with the smoke clearing system may be embodied in a program command form which may be executed through various computer units and recorded in computer-readable media. The computer-readable media may contain program commands, data files, data structures, and combinations thereof. The program commands recorded in the medium may be specially designed for the exemplary embodiments. Alternatively, the program commands may be well-known by those skilled in computer software. The computer-readable media may include hardware devices specially configured to store and execute program commands. For example, magnetic media, such as a hard disk, a floppy disk and a magnetic tape, optical media, such as a CD-ROM and a DVD, a magneto-optical media, such as a floptical disk, a ROM, a RAM and a flash memory may be used as the computer-readable media. The program commands may include a machine language prepared by a compiler and a high-level language code prepared by an interpreter so as to be executed by a computer. The above-mentioned hardware devices may be configured to operate as one or more software modules to operate the exemplary embodiments and vice versa. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Python, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter situation scenario, the remote computer may be connected to the user’s computer through any type of network, including a local area network (LAN) or a wide area network (WAN), or the connection may be made to an external computer (for example, through the Internet using an Internet Service Provider). These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings regarding relative dimensions in the drawings. However, for each drawing, at least one embodiment is made according to the apparent relative scale of the drawing.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but they are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and may describe the best mode contemplated, no matter how detailed the above appears in text, the teachings can be practiced in many ways. Details of the system may vary considerably in its embodiment details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed as invention is:

1. An apparatus for reducing the viability of airborne biological organisms in a closed environment, the apparatus comprising:

- a fibrous substrate comprising one or more of non-conductive fibers and non-conductive yarns;
- elongated, substantially parallel electrodes disposed on or embedded in the fibrous substrate arranged as one or more pairs of adjacent electrodes, wherein a discharge gap is defined between each pair;
- a component configured for applying a voltage between each pair to generate a non-thermal microplasma in a corresponding discharge gap, wherein the non-thermal microplasma reduces the viability of one or more aerosolized biological organisms within the closed environment; and
- a detector in communication with the apparatus.

2. The apparatus of claim 1, wherein reducing the viability of airborne biological organisms comprises one or more of: antimicrobial activity and antiviral activity.

3. The apparatus of claim 1, wherein the apparatus is configured to perform lysis.

4. The apparatus of claim 1, wherein each electrode has a characteristic dimension ranging from 1 μm to 1 mm.

5. The apparatus of claim 1, wherein the fibrous substrate has a cylindrical configuration.

6. The apparatus of claim 5, wherein the electrodes form a double helix profile within the cylindrical configuration.

7. An apparatus for reducing the viability of airborne biological organisms in a closed environment, the apparatus comprising:

- a fibrous substrate comprising one or more of non-conductive fibers and non-conductive yarns;
- elongated, substantially parallel electrodes disposed on or embedded in the fibrous substrate arranged as one or more pairs of adjacent electrodes, wherein a discharge gap is defined between each pair;
- a component configured for applying a voltage between each pair to generate a non-thermal microplasma in a corresponding discharge gap, wherein the non-thermal microplasma reduces the viability of one or more airborne biological organisms in air present within the closed environment;
- wherein reducing the viability of the one or more aerosolized biological organisms comprises one or more of: antimicrobial activity and antiviral activity;
- wherein the apparatus is configured to perform lysis;
- wherein the fibrous substrate has a cylindrical configuration; and
- wherein the elongated, substantially parallel electrodes have a double helix profile within the cylindrical configuration and prevent arcing between the pairs of adjacent electrodes along the cylindrical configuration.

8. An apparatus for reducing the viability of airborne biological organisms in a closed environment, the apparatus comprising:

a fibrous substrate comprising one or more of non-conductive fibers and non-conductive yarns;

elongated, substantially parallel electrodes disposed on or embedded in the fibrous substrate arranged as one or more pairs of adjacent electrodes, wherein a discharge gap is defined between each pair;

a component configured for applying a voltage between each pair to generate a non-thermal microplasma in a corresponding discharge gap, wherein the non-thermal microplasma reduces the viability of one or more aerosolized biological organisms in air present within the closed environment; and a detector in communication with the apparatus.

* * * * *